United States Patent [19]

Cummins

[11] Patent Number: 5,443,854
[45] Date of Patent: Aug. 22, 1995

[54] DOUGH TREATING AND DISPENSING METHOD AND APPARATUS

[75] Inventor: Donald L. Cummins, deceased, late of Mechanicsville, Va., by Marian G. Cummins executor

[73] Assignee: Cummins Eagle, Inc., Mechanicsville, Va.

[21] Appl. No.: 297,123

[22] Filed: Aug. 29, 1994

[51] Int. Cl.⁶ .................... A21C 1/00; A21D 6/00
[52] U.S. Cl. .................... 426/231; 425/145; 425/205; 425/207; 425/311; 426/503; 426/504; 426/516
[58] Field of Search ............... 426/231, 496, 503, 504, 426/516; 425/145, 203, 205, 207, 311

[56] References Cited

U.S. PATENT DOCUMENTS

| | | | |
|---|---|---|---|
| 4,332,538 | 6/1982 | Campbell | 425/311 |
| 4,391,576 | 7/1983 | Cummins | 425/241 |
| 4,424,236 | 1/1984 | Campbell | 426/231 |
| 4,449,908 | 5/1984 | Campbell | 425/204 |
| 4,517,212 | 5/1985 | Campbell | 426/503 |
| 4,661,364 | 4/1987 | Campbell | 426/503 |
| 4,786,517 | 11/1988 | Pinto | 426/503 |
| 4,948,611 | 8/1990 | Cummins | 426/503 |
| 4,960,601 | 10/1990 | Cummins | 426/504 |

*Primary Examiner*—George Yeung
*Attorney, Agent, or Firm*—Norman B. Rainer

[57] ABSTRACT

Dough intended for use in producing bakery products is homogenized and advanced to extrusion nozzles where it is cut into successive pieces that fall onto a moving conveyor. The pieces are of precisely uniform weight because a constant pressure is maintained on the dough as it is forwarded by a metering pump toward the nozzles. Apparatus for achieving such result includes an auger, a developer positioned downstream from the auger, and a transition chamber fed by the developer and located upstream from the metering pump. A pressure-measuring monitor serves to control the rotational speed of the auger, thereby maintaining the dough under constant pressure within the apparatus.

10 Claims, 4 Drawing Sheets

DOUGH TREATING AND DISPENSING METHOD AND APPARATUS

BACKGROUND OF THE INVENTION

1. Field of the Invention

This invention relates to the handling of dough for baking, and more particularly concerns a method and apparatus for dispensing successive pieces of dough of constant weight.

2. Description of the Prior Art

Methods and apparatus for pumping, homogenizing and dividing dough into pieces of predetermined uniform weight for baking into bread loaves, buns, rolls and the like are disclosed in U.S. Pat. Nos. 4,960,601, 4,517,212; 4,449,908; 4,424,236; and 4,332,538. In general, such apparatus includes a hopper which receives dough, auger means for advancing the dough, metering means which control the advance of the dough, multiple nozzles which receive the metered dough, and cutting means which sever the continuously advancing dough into discrete pieces which fall onto an underlying moving belt. A homogenizing step is usually included, which may be accomplished by mixing means usually referred to as a "developer".

It is very important that each dough piece be as equal in weight to each other as possible. The uniformity of weight not only produces products of uniform quality but facilitates the automated handling and packaging of the baked products. Also, the weight of the dough is one of the most expensive cost elements in manufacturing baked goods, and control of the weight tolerances can reduce the need for excess dough. The production of dough pieces of uniform weight is known as scaling in the trade. In general, less than 2% deviation in weight is sought relative to a target weight.

Metering means such as cylinder-housed pistons have been employed to achieve improved scaling. However such devices require use of mineral oil which escapes as an undesirable atomized vapor of concern as a health hazard. Such devices also produce an undesirable high noise level. Although metering means, such as a positive displacement pump, has been employed to achieve uniform scaling, inaccuracies are experienced. This results from the fact that the metering pump dispenses a constant volume, but the dough has a non-uniform density because of gas-formation produced by the yeast content of the dough. Prior efforts to achieve greater uniformity of dough density have included degassing techniques and pressurization of the dough upstream of the volumetric metering means.

It has been found however, that dough can degrade in the dough-handling apparatus, the degree of degradation being increased by factors such as high pressure, the time duration of said pressure, and shearing forces at the surfaces of passages through which the dough travels. The degradation becomes apparent in the finished product in the form of swirl patterns and non-uniformity of texture along with discoloration and circular stratiform.

Equipment for processing the dough has generally involved hydraulically driven motors. Such motors permit leakage of hydraulic fluid onto the surfaces that contact the dough, and further produce high noise levels.

It is accordingly an object of the present invention to provide apparatus for pumping, homogenizing and dividing dough into successive pieces of uniform weight.

It is another object of this invention to provide apparatus as in the foregoing object which produces minimal degradation of the dough.

It is another object of the present invention to provide apparatus of the aforesaid nature having few moving components.

It is a still further object of this invention to provide apparatus of the aforesaid nature which an be easily dismantled to facilitate cleaning and repair.

It is yet another object of the present invention to provide a method, achievable by the aforesaid apparatus, for dispensing successive pieces of dough of uniform weight.

These and other beneficial objects and advantages will be apparent from the following description.

SUMMARY OF THE INVENTION

The above and other beneficial objects and advantages are accomplished in accordance with the present invention by a dough treating and dispensing method comprising:

a) entering dough into a vertically oriented hopper having a lowermost exit extremity that makes pressure-tight joinder with the upstream extremity of a cylindrical low-friction first bore which houses an auger, b) degassing said dough by exposure to vacuum means applied within said bore before said auger, c) advancing the dough within said first bore by rotary motion of said auger, said rotation being produced by an electric motor, d) subjecting the dough to a homogenizing treatment in a second low-friction bore disposed downstream from said first bore, e) causing said dough to advance from said second bore into a transition zone wherein the pressure of the dough is measured, and an electrical control signal proportionate to the measured pressure is routed to the motor that drives the auger, whereby the speed of rotation of said auger is adjusted so as to maintain constant pressure on the dough, as measured in said transition zone, f) advancing the dough from said transition zone through a rotary positive displacement metering pump, g) receiving the dough from the pump into a horizontally elongated distribution zone which communicates with a plurality of downwardly directed extrusion channels, and h) controllably restricting passage of the dough through said channels by adjustable pressure drop regulators, whereby i) the dough is maintained at a controlled pressure throughout its journey from the exit extremity of the hopper to said adjustable pressure drop regulators.

The present invention further encompasses apparatus for treating and dispensing dough, said apparatus comprising:

a) a vertically oriented dough-receiving hopper having a lowermost exit extremity, b) an advancing assembly disposed below said exit extremity in pressure-tight relationship therewith, said advancing assembly having first and second low friction bores in parallel relationship and coupling means achieving continuity between said bores, an auger disposed within said first bore, a homogenizing member disposed within said second bore, an exit port associated with said second bore, and first and second electric motors for separately rotating said auger and homogenizing member, respectively, within their bores, said motors having independent speed control means, c) a transition housing in communication with said exit port, d) pressure-sensing and signaling means interactive with the interior of said transition housing and electrically connected to the speed control means of said first motor, e) a rotary positive displacement metering pump joined to said transition housing, f) a horizontally disposed distribution manifold positioned below said pump and communicating therewith, g) a plurality of extrusion conduits downwardly directed from said manifold, each conduit having adjustable pressure drop regulator means and a lower extremity having an extrusion orifice, and h) a cutting wire which severs into discrete pieces dough emergent from said orifices.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Referring to FIGS. 1–5, an embodiment of the dough treating and dispensing apparatus of the present invention is shown comprised of hopper 10 disposed above advancing assembly 11 which is positioned above transition housing 12, metering pump 13 and extrusion conduits 56. An outer framework 42 provides support for said components.

Figure 1:
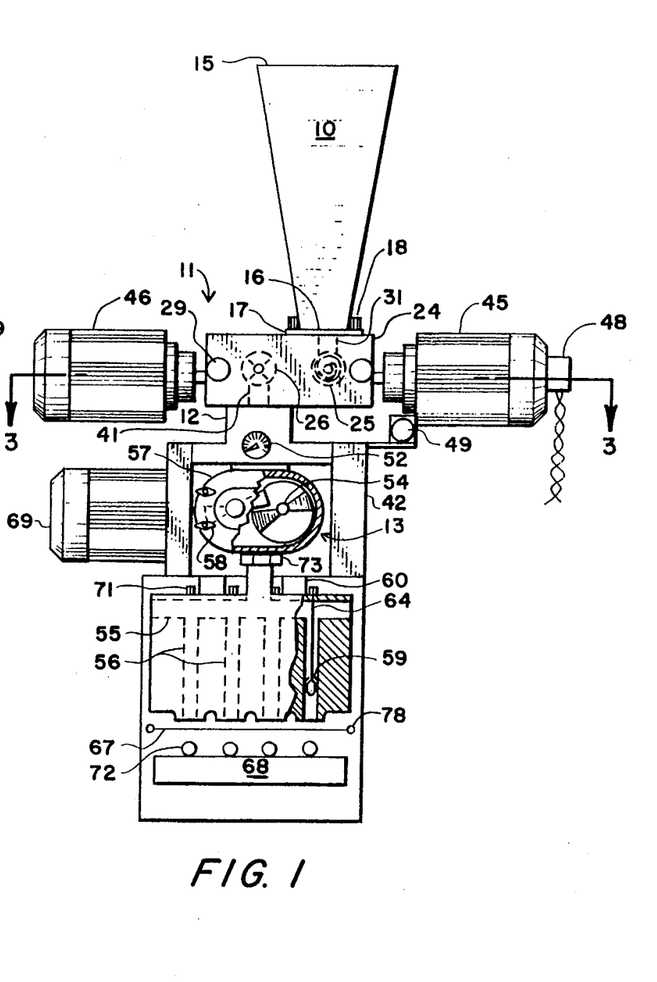
FIG. 1 is a front view of an embodiment of the apparatus of the present invention, with portions broken away to reveal internal details.
Figure 2:
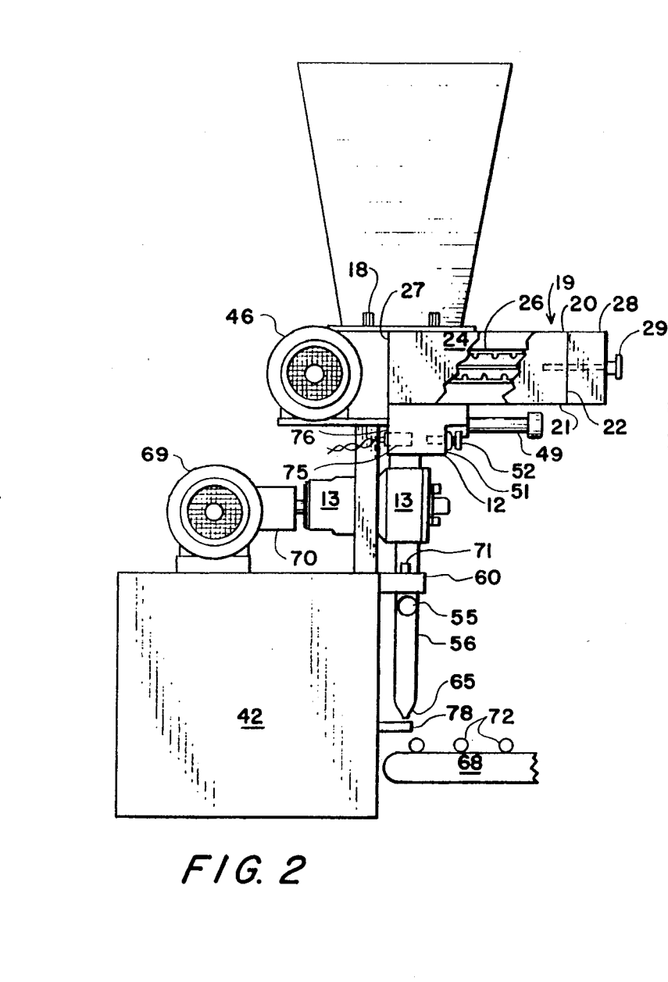
FIG. 2 is a side view of the embodiment of FIG. 1 with portions broken away.

Hopper 10 is of integral construction and tapered downwardly from upper extremity 15 to lowermost exit extremity 16. The hopper is contoured so as to have no corners where dough might accumulate as a stagnant zone. Exit extremity 16 is equipped with an outwardly directed flange 17 which permits sealed joinder to advancing assembly 11 using bolts 18. A resilient gasket or O-ring, or equivalent means may be employed to assure pressure-tight joinder of the hopper to the advancing assembly.

Figure 3:
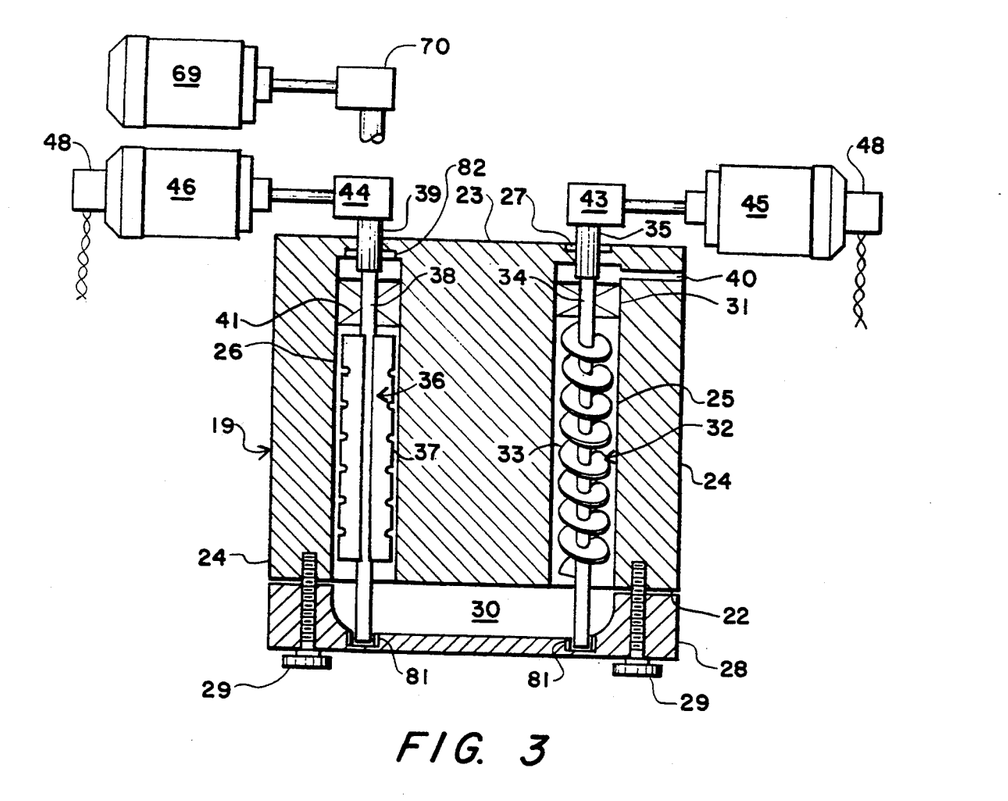
FIG. 3 is an enlarged sectional view taken in the direction of the arrows upon the line 3—3 of FIG. 1.
Figure 3A:
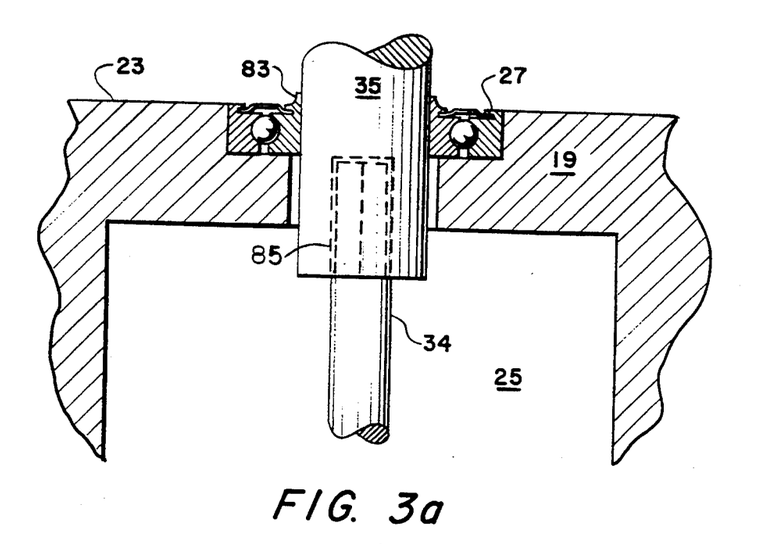
FIG. 3a and 3b are enlarged fragmentary views of FIG. 3.
Figure 3B:
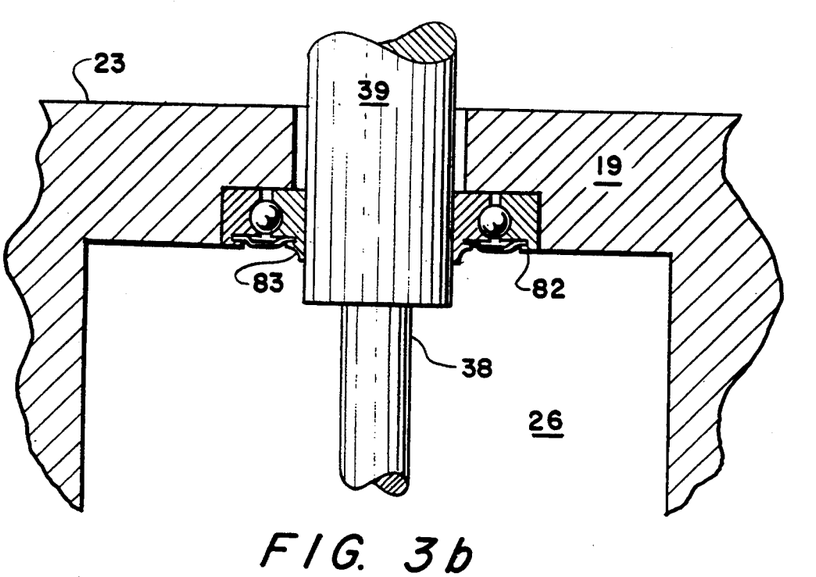

As shown in FIGS. 1, 2, and 3, advancing assembly 11 is comprised in part of receiver block 19 of generally rectangular configuration bounded by flat upper and lower surfaces 20 and 21, respectively, flat front and rear surfaces 22 and 23, respectively, and opposed side surfaces 24. First and second circular cylindrical bores 25 and 26, respectively, extend in parallel disposition between said front and rear surfaces. As shown in FIGS. 3a and 3b, sealing bushings 27 and 82, associated with bores 25 and 26, respectively, are associated with rear surface 23.

It is to be noted that bushing 27 contains an outwardly directed wiper lip 83 adapted to prevent fluid flow into bore 25 whereas bushing 82 contains an inwardly directed wiper lip 84 adapted to prevent fluid flow out of bore 26.

A coupling block 28 is removably associated with front surface 22 by bolts 29, and has a passage 30 configured to establish continuity between the front extremities of both bores. A receiving port 31 penetrates upper surface 20 and establishes communication between exit extremity 16 of the hopper and first bore 25. An auger 32 is housed within said first bore, said auger being comprised of a continuous vane 33 that extends to a radial clearance of 0.020–0.040 inch with respect to said bore, and centered shaft 34 that extends rearwardly to socketed engagement with receiver shaft 35 secured by bushing 27. To achieve said socketed engagement, the rearward extremity of the centered shaft is of a square contour, matching the contour of pocket 85 of said receiver shaft. The forward extremity of shaft 34 is rotatively supported by bearing boss 81 held by coupling block 28. By virtue of such manner of construction, auger 32 can be easily pulled out of bore 25 to facilitate cleaning. A de-gassing port 40 extends through block 19 into said first bore at a site rearwardly of vane 33, and communicates with a vacuum source, not shown. Bushing 27 prevents air from being withdrawn into bore 25 in response to the vacuum applied to receiving port 31.

A developer unit 36 is disposed within said second bore, said developer comprised of a plurality of blades 37 equiangularly disposed about shaft 38 that extends rearwardly to socketed engagement with receiver shaft 39 secured by bushing 82. The blades are radially spaced about 1/16" from the bore. The forward extremity of shaft 38 is rotatively supported by bearing boss 81 held by coupling block 28. The developer unit 36, like the auger, can accordingly be pulled out of its bore to facilitate cleaning. The developer may alternatively be of paddle or ribbon design. An exit port 41 extends between the rear extremity of the second bore and lower surface 21. Receiver block 19 and coupling block 28 are preferably fabricated of engineering grade plastic having a low coefficient of surface friction. Suitable plastics include ultra-high molecular weight polyolefin, polyacetal, polyester, polyamide, and other moldable plastics having equivalent properties.

The rear extremities of receiver shafts 35 and 39 extend to right angle drive units 43 and 44, respectively, which are driven by inverter-controlled variable speed electric motors 45 and 46, respectively. The auger and developer are adapted to rotate in opposite directions. A separate inverter electrical speed controller 48 is associated with each motor 46 and 45. Inverter 48, of standard construction, is designed to receive a control signal which is utilized to control the voltage and frequency of current which powers the respective motor.

A suitable inverter controller is the Movitrac model G-2 made by the Toshiba Company. Both motors may be identical, having a horsepower rating in the range of 3 to 7 HP. The auger is typically rotated at speeds in the range of 50–250 rpm. The developer is typically rotated at speeds in the range of 50–300 rpm. The entire advancing assembly may be constructed so that it may be pivoted upward about pivot rod 49 attached to frame 42 in parallel relationship to end surface 24 adjacent motor 45. Pivoted lifting of the advancing assembly facilitates cleaning and repair. Suitable means may be provided to secure the head assembly in its upper, cleaning position, and in its lowermost, functional position.

Transition housing 12 is disposed below lower surface 21 of said head assembly and configured to establish pressure-tight connection with exit port 41. The front surface 51 of housing 12 secures a pressure indicating device 52 which senses and indicates the hydraulic pressure within housing 12. An electronic pressure-sensing transducer 75 inserted through rear surface 76 of housing 12 produces an electrical control signal which is fed to inverter 48. By virtue of such arrangement, the speed of auger 32 is controlled. Because the route taken by the dough within the apparatus is pressure-tight, increased rotational speed of the auger produces increased pressure on the dough at transducer 75. In general, the configuration of the apparatus and its operating parameters are such that a constant pressure in the range of 15–28 psig is maintained at transducer 75.

A rotary positive displacement metering pump 13 is joined in a pressure-tight manner to the underside of housing 12, and receives dough therefrom. A suitable metering pump is Model 34 made by the Waukesha Company of Delavan, Wis. Said pump is driven by inverter controlled variable speed motor 69, acting through a right angle coupling 70, and is characterized in having two dual lobe intersecting rotors 54. A face plate 57 held by bolts 58 can be removed to facilitate removal of the rotors and cleaning of the interior of the pump.

A horizontally disposed distribution manifold 55 is positioned below said pump and coupled thereto in pressure-tight but removable joinder by means of threaded fitting 73.

Figure 4:
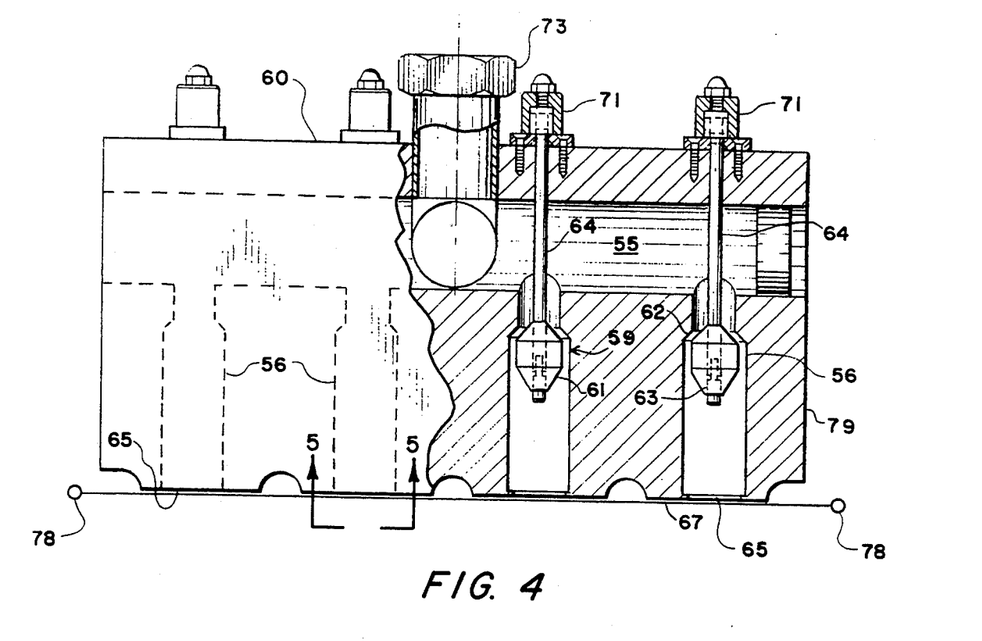
FIG. 4 is an enlarged fragmentary front view of the embodiment as shown in FIG. 1.

A plurality of parallel extrusion conduits 56 are downwardly directed from said manifold Said distribution manifold and extrusion conduits 56 are exemplified as being fashioned from a single block 79 of engineering grade plastic Each conduit contains a pressure drop regulator assembly 59, as best shown in FIG. 4, comprising a control stem 64 which extends upwardly through manifold 55 to the top of block 79 where it is threadably secured at a desired elevation by means of threaded control knob 71.

A conically tapered plug 61 is disposed upon the lowermost extremity of each control stem, and adapted to abut upwardly with a conically tapered shoulder 62 within conduit 56 A coil spring 63 is interposed between the lowermost extremity of stem 64 and plug 61. By virtue of such arrangement, upward movement of stem 64 constricts conduit 56, thereby increasing the upstream pressure of the dough.

Figure 5:
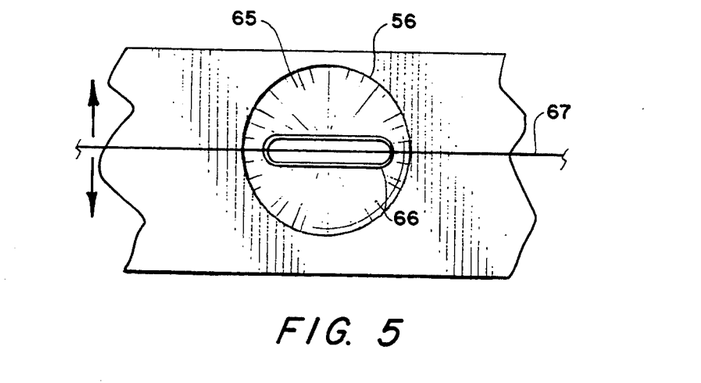
FIG. 5 is an enlarged fragmentary bottom view taken in the direction of the arrows upon the line 5—5 of FIG. 4.

The lowermost extremity of each conduit has a tapered extrusion nozzle 65, as best shown in FIGS. 4 and 5, having an orifice 66 that is elongated in the same direction as manifold 55. A cutting wire 67 mounted upon opposed support posts 78 is disposed below said nozzles, and is adapted to pass back and fourth over said orifices in sliding contact therewith to produce pieces of dough 72. The motion of the wire is transverse to the direction of elongation of the orifice. Such combination of elongated orifice and transverse cutting direction has been found to provide a faster cutting action. The wire is further caused to ride along the tapered sides of the nozzle before crossing the orifice. The sequentially severed pieces of dough fall onto a moving belt 8 of conventional design, which carries the pieces of dough to further downstream processing prior to baking. The aforementioned specialized configuration of nozzle and associated cutting wire reduces dwell time during cutting, thereby enhancing weight uniformity and producing more accurate positioning of the pieces of dough upon the belt. Positioning of the pieces is very important in order to assure that the pieces are timed accurately for handling by downstream processing equipment. Otherwise, the pieces would jam the equipment and stop the process.

The upper portion of the apparatus of this invention, comprising the hopper and advancing assembly may, as a unit, be installed upon existing dough dispensing apparatus. Said upper portion in fact includes novel features, as described above, which cause said upper portion to be a separately patentable aspect of the present invention.

By virtue of the aforesaid specialized features of the apparatus of this invention, the pressure of the dough entering the metering pump is held constant while minimizing shear degradation. In particular, the pressure of the dough within the apparatus of this invention is controlled throughout a zone defined at its upstream extremity by bushing 28, and defined at its downstream extremity by tapered plug 61. The attendant constant density of the dough produces remarkably accurate scaling of below 1% deviation from a target weight. A further consequence of the method and apparatus of this invention is the production of bakery products of improved textural uniformity. In particular, the pore or cell diameter exhibits less than 4% variation from the average diameter.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A dough treating and dispensing method comprising:
   a) entering dough into a vertically oriented hopper having a lowermost exit extremity that joins with the upstream extremity of a cylindrical low-friction first bore which houses an auger,
   b) degassing said dough by exposure to vacuum means applied within said bore before said auger,
   c) advancing the dough within said first bore by rotary motion of said auger, said rotation being produced by an electric motor,
   d) subjecting the dough to a homogenizing treatment in a second low-friction bore disposed downstream from said first bore,
   e) causing said dough to advance from said second bore into a transition zone wherein the pressure of the dough is measured, and an electrical control signal proportionate to the measured pressure is routed to the motor that drives the auger, whereby the speed of rotation of said auger is adjusted so as to maintain constant pressure on the dough, f) advancing the dough from said transition zone through a rotary positive displacement metering pump, g) receiving the dough from the pump into a horizontally elongated distribution zone which communicates with a plurality of downwardly directed extrusion channels, and h) controllably restricting passage of the dough through said channels by adjustable pressure drop regulators, whereby i) the dough is maintained at a controlled pressure throughout its journey from said auger to said adjustable pressure drop regulators.

2. Apparatus for treating and dispensing dough, said apparatus:

a) a vertically oriented dough-receiving hopper having a lowermost exit extremity, b) an advancing assembly disposed below said exit extremity and having first and second low friction bores in parallel relationship and coupling means achieving continuity between said bores, an auger disposed within said first bore, a homogenizing member disposed within said second bore, an exit port associated with said second bore, and first and second electric motors for separately rotating said auger and homogenizing member, respectively, within their bores, said motors having independent speed control means, c) a transition housing in communication with said exit port, d) pressure-sensing and signaling means interactive with the interior of said transition housing and electrically connected to the speed control means of said first motor, e) a rotary positive displacement metering pump joined to said transition housing, f) a horizontally disposed distribution manifold positioned below said pump and communicating therewith, g) a plurality of extrusion conduits downwardly directed from said manifold, each conduit having adjustable pressure drop regulator means and a lower extremity having an extrusion orifice, and h) a cutting wire which severs into discrete pieces dough emergent from said orifices.

3. An advancing assembly adapted to receive dough from a hopper, and controllably forward said dough downwardly to equipment for scaling said dough into uniform pieces deposited onto a conveyor, said advancing assembly comprising:

a) a receiver block of generally rectangular configuration bounded by substantially flat upper, lower, front, rear and opposed side surfaces, b) first and second cylindrical bores disposed within said block in parallel disposition and elongated between said front and rear surfaces, c) sealing bushings disposed within said bores in association with said rear surface, d) a receiving port which penetrates said upper surface and communicates with said first bore, e) an exit port extending between said lower surface and said second bore, f) an auger comprised of a helical vane mounted upon a centered shaft having forward and rearward extremities, said auger rotationally disposed within said first bore, g) a developer having at least one dough-contacting blade mounted upon a centered shaft having forward and rearward extremities, said developer disposed within said second bore and adapted to rotate therein in a direction opposite to the direction of rotation of said auger, h) a coupling block removably associated with said front surface and having a passage that communicates with said first and second bores, and i) speed controllable electric motors that separately drive said auger and developer.

4. The advancing assembly of claim 3 wherein said sealing bushings hold receiver shafts having a rear extremity that couples with said motor, and a forward extremity having a centered recessed pocket.

5. The advancing assembly of claim 4 wherein the rearward extremities of said centered shafts achieve socketed sliding coupling with said recessed pockets, thereby enabling the auger and developer to be pulled out of their respective bores.

6. The apparatus of claim 2 wherein said extrusion orifice is the lowermost extremity of a conically tapered shoulder of a nozzle.

7. The apparatus of claim 6 wherein said orifice is elongated in the same direction as said cutting wire.

8. The apparatus of claim 7 wherein said cutting wire rides upon said tapered shoulder in a reciprocating motion across said orifice, cutting the dough in each direction of traversal across said orifice.

9. The apparatus of claim 2 wherein said speed control means is an inverter electrical speed controller.

10. The apparatus of claim 9 wherein the auger and developer rotate in opposite directions.

* * * * *

US005443854B1

REEXAMINATION CERTIFICATE (4005th)

United States Patent [19]
Cummins

[11] B1 5,443,854
[45] Certificate Issued Feb. 29, 2000

[54] DOUGH TREATING AND DISPENSING METHOD AND APPARATUS

[75] Inventor: Donald L. Cummins, deceased, late of Mechanicsville, Va., by Marian G. Cummins, executor

[73] Assignee: Cummins Eagle Inc., Mechanicsville, Va.

Reexamination Request:
No. 90/005,170, Nov. 30, 1998

Reexamination Certificate for:
Patent No.: 5,443,854
Issued: Aug. 22, 1995
Appl. No.: 08/297,123
Filed: Aug. 29, 1994

[51] Int. Cl.[7] .............................. A21C 1/00; A21D 6/00
[52] U.S. Cl. ..................... 426/231; 425/145; 425/205; 425/207; 425/311; 426/503; 426/504; 426/516
[58] Field of Search ................................. 426/231, 496, 426/503, 504, 516; 425/145, 203, 205, 207, 311

[56] References Cited

U.S. PATENT DOCUMENTS

| | | |
|---|---|---|
| 557,505 | 3/1896 | Gloekler . |
| 1,303,151 | 5/1919 | Bainbridge . |
| 1,350,722 | 8/1920 | Goodenberger . |
| 1,383,177 | 6/1921 | Venn . |
| 1,571,121 | 1/1926 | Humphreys . |
| 3,008,434 | 11/1961 | Maldari ................................ 107/14 |
| 3,030,898 | 4/1962 | Freed ................................... 107/40 |
| 3,203,370 | 8/1965 | Haug et al. ........................... 107/30 |
| 3,225,715 | 12/1965 | Page ..................................... 107/30 |
| 3,332,369 | 7/1967 | Freed ................................... 107/40 |
| 3,776,671 | 12/1973 | Bruschke et al. .................... 425/164 |
| 3,927,611 | 12/1975 | Papalexis et al. .................... 99/472 |
| 4,948,611 | 8/1990 | Cummins ............................. 426/503 |
| 4,960,601 | 10/1990 | Cummins ............................. 426/504 |
| 5,046,940 | 9/1991 | Cummins ............................. 425/239 |
| 5,123,830 | 6/1992 | Papalexis ............................. 425/307 |

OTHER PUBLICATIONS

AMF Superior Bun Divider, 4 pages, published Aug. 1989 ("SBD").

Degassing and Texturing Doughs, by Ratcliffe W. Harris, including cover page, 12 pages of description, 18 pages of illustrations/slides, with accompanying interoffice correspondence establishing the date of 1985.

Do–Flow Stainless Steel Update Kit Feature Option 00001–100, by Union Machinery Division, AMF Incorporated, dated Feb. 20, 1985.

SBD–Do–Flow Retrofit Installation, by AMF Bakery Systems, Richmond, Virginia, dated Aug. 23, 1991, CVC No. 33531–143.

*Primary Examiner*—George C. Yeung

[57] ABSTRACT

Dough intended for use in producing bakery products is homogenized and advanced to extrusion nozzles where it is cut into successive pieces that fall onto a moving conveyor. The pieces are of precisely uniform weight because a constant pressure is maintained on the dough as it is forwarded by a metering pump toward the nozzles. Apparatus for achieving such result includes an auger, a developer positioned downstream from the auger, and a transition chamber fed by the developer and located upstream from the metering pump. A pressure-measuring monitor serves to control the rotational speed of the auger, thereby maintaining the dough under constant pressure within the apparatus.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2 and 6–10 is confirmed.

Claim 3 is determined to be patentable as amended.

Claims 4 and 5, dependent on an amended claim, are determined to be patentable.

New claims 11–13 are added and determined to be patentable.

3. An advancing assembly adapted to receive dough from a hopper, and controllably forward said dough downwardly to equipment for scaling said dough into uniform pieces deposited onto a conveyor, *each dough piece having a weight deviating less than approximately 2% from a selectable target weight,* said advancing assembly comprising;
   a) a receiver block of generally rectangular configuration bounded by substantially flat upper, lower, front, rear, and opposed side surfaces,
   b) first and second cylindrical bores disposed within said block in parallel disposition and elongated between said front and rear surfaces,
   c) sealing bushings disposed within said bores in association with said rear surface,
   d) a receiving port which penetrates said upper surface and communicates with said first bore,
   e) an exit port extending between said lower surface and said second bore,
   f) an auger comprised of a helical vane mounted upon a centered shaft having forward and rearward extremities, said auger rotationally disposed within said first bore,
   g) a developer having at least one dough-contacting blade mounted upon a centered shaft having forward and rearward extremities, said developer disposed within said second bore and adapted to rotate therein in a direction opposite to the direction of rotation of said auger,
   h) a coupling block removably associated with said front surface and having a passage that communicates with said first and second bores, [and]
   i) speed controllable electric motors that separately drive said auger and developer, *and*
   j) *means for maintaining the dough in a pressurized state at a pressure greater than atmosphere as the dough travels from said auger until the dough exits from the scaling equipment as uniform pieces of dough each having a weight deviating less than approximately 2% from a selectable target weight.*

11. *An advancing assembly adapted to receive dough from a hopper, and controllably forward said dough downwardly to equipment for scaling said dough into uniform pieces deposited onto a conveyor, each having a diameter varying less than approximately 4% from the average diameter of the dough pieces, said advancing assembly comprising;*
   a) *a receiver block of generally rectangular configuration bounded by substantially flat upper, lower, front, rear, and opposed side surfaces,*
   b) *first and second cylindrical bores disposed within said block in parallel disposition and elongated between said front and rear surface,*
   c) *sealing bushings disposed within said bores in association with said rear surface,*
   d) *a receiving port which penetrates said upper surface and communicates with said first bore,*
   e) *an exit port extending between said lower surface and said second bore,*
   f) *an auger comprised of a helical vane mounted upon a centered shaft having forward and rearward extremities, said auger rotationally disposed within said first bore,*
   g) *a developer having at leasat one dough-contacting blade mounted upon a centered shaft having forward and rearward extremities, said developer disposed within said second bore and adapted to rotate therein in a direction opposite to the direction of rotation of said auger,*
   h) *a coupling block removably associated with said front surface and having a passage that communicates with said first and second bores,*
   i) *speed controllable electric motors that separately drive said auger and developer, and*
   j) *means for maintaining the dough in a pressurized state at a pressure greater than atmosphere as the dough travels from said auger until the dough exits from the scaling equipment into uniform pieces of dough each having a diameter varying less than approximately 4% from the average diameter of the dough pieces.*

12. *An advancing assembly adapted to receive dough from a hopper, and controllably forward said dough downwardly to equipment for scaling said dough into uniform pieces deposited onto a conveyor, said advancing assembly comprising;*
   a) *a receiver block of generally rectangular configuration bounded by substantially flat upper, lower, front, rear, and opposed side surfaces,*
   b) *first and second cylindrical bores disposed within said block in parallel disposition and elongated between said front and rear surface,*
   c) *sealing bushings disposed within said bores in association with said rear surface,*
   d) *a receiving port which penetrates said upper surface and communicates with said first bore,*
   e) *an exit port extending between said lower surface and said second bore,*
   f) *an auger comprised of a helical vane mounted upon a centered shaft having forward and rearward extremities, said auger rotationally disposed within said first bore,*
   g) *a developer having at least one dough-contacting blade mounted upon a centered shaft having forward and rearward extremities, said developer disposed within said second bore and adapted to rotate therein in a direction opposite to the direction of rotation of said auger,* h) a coupling block removably associated with said front surface and having a passage that communicates with said first and second bores, i) speed controllable electric motors that separately drive said auger and developer, and j) means for maintaining the dough in a pressurized state at a pressure greater than atmosphere as the dough travels from said auger until the dough exits from the scaling equipment, said dough at said exit port being at a selectable pressure in the range of 15–28 psig.

13. An advancing assembly adapted to receive dough from a hopper, and controllably forward said dough downwardly to equipment for scaling said dough into uniform pieces deposited onto a conveyor, said advancing assembly comprising;

a) a receiver block of generally rectangular configuration bounded by substantially flat upper, lower, front, rear, and opposed side surfaces, b) first and second cylindrical bores disposed within said block in parallel disposition and elongated between said front and rear surface, c) sealing bushings disposed within said bores in association with said rear surface, d) a receiving port which penetrates said upper surface and communicates with said first bore, e) an exit port extending between said lower surface and said second bore, f) an auger comprised of a helical vane mounted upon a centered shaft having forward and rearward extremities, said auger rotationally disposed within said first bore, g) a developer having at least one dough-contacting blade mounted upon a centered shaft having forward and rearward extremities, said developer disposed within said second bore and adapted to rotate therein in a direction opposite to the direction of rotation of said auger, h) a coupling block removably associated with said front surface and having a passage that communicates with said first and second bores, i) speed controllable electric motors that separately drive said auger and developer, j) means for maintaining the pressure of the dough at said exit port in the range of 15–28 psig, and k) means for maintaining the dough in a pressurized state at a pressure greater than atmosphere as the dough travels from said auger until the dough exits from the scaling equipment into uniform pieces of dough each having a diameter varying less than approximately 4% from the average diameter of the dough pieces and each having a weight deviating less than approximately 2% from a selectable target weight.

* * * * *